(12) United States Patent  (10) Patent No.: US 8,182,043 B2
Baladi  (45) Date of Patent: May 22, 2012

(54) SEATBELT RETENTION DEVICE AND SYSTEM

(75) Inventor: George Joseph Baladi, New South Wales (AU)

(73) Assignee: Tummy Shield Holdings Pty Limited, New South Wales (AU)

( * ) Notice: Subject to any disclaimer, the term of this patent is extended or adjusted under 35 U.S.C. 154(b) by 367 days.

(21) Appl. No.: 12/442,521

(22) PCT Filed: Sep. 19, 2007

(86) PCT No.: PCT/AU2007/001381
§ 371 (c)(1),
(2), (4) Date: Aug. 26, 2009

(87) PCT Pub. No.: WO2008/034179
PCT Pub. Date: Mar. 27, 2008

(65) Prior Publication Data
US 2010/0013291 A1  Jan. 21, 2010

Related U.S. Application Data

(60) Provisional application No. 60/846,572, filed on Sep. 22, 2006.

(51) Int. Cl.
*B60R 22/02* (2006.01)
(52) U.S. Cl. ..................................... 297/467
(58) Field of Classification Search .................. 297/466, 297/467
See application file for complete search history.

(56) References Cited

U.S. PATENT DOCUMENTS

| 5,005,865 | A | | 4/1991 | Kruse |
| 5,257,854 | A | | 11/1993 | Korneliussen |
| 5,352,024 | A | | 10/1994 | Grene |
| 5,533,786 | A | * | 7/1996 | Cone, II ................. 297/256.15 |
| 5,833,311 | A | * | 11/1998 | Friedrich et al. ......... 297/216.11 |
| 6,260,925 | B1 | * | 7/2001 | Miller ............................ 297/467 |
| 6,318,754 | B1 | | 11/2001 | Einsiedel et al. |
| 6,517,163 | B2 | | 2/2003 | Herrmann |
| 6,935,700 | B1 | | 8/2005 | Nerette |
| 2002/0109391 | A1 | * | 8/2002 | Shie ............................. 297/467 |
| 2003/0197357 | A1 | | 10/2003 | Heigl et al. |
| 2005/0012309 | A1 | | 1/2005 | Blackson et al. |

FOREIGN PATENT DOCUMENTS

| DE | 100 33 319 A1 | 1/2002 |
| DE | 202 06 340 UI | 8/2002 |
| DE | 103 28 562 A1 | 1/2005 |
| EP | 0 976 624 A2 | 2/2000 |
| EP | 1201511 A1 | 5/2002 |
| JP | 63222956 | 9/1988 |
| WO | WO 90/08676 A1 | 8/1990 |
| WO | WO 97/00184 | 1/1997 |

* cited by examiner

*Primary Examiner* — Peter R. Brown
(74) *Attorney, Agent, or Firm* — Patterson Thuente Christensen Pedersen, P.A.

(57) ABSTRACT

A seatbelt retention device with a base located on the upper seat surface of a vehicle seat and a seatbelt catch mounted on the base to retain the waist section of a seatbelt. The seatbelt retention device receives a passenger on the base in use, such that the catch is accessible between the legs of the passenger. A vehicle seat assembly can incorporate the seatbelt catch mounted in the seat and projecting through the upper seat surface so as to be accessible between the legs of a passenger seated on the seat.

18 Claims, 6 Drawing Sheets

SEATBELT RETENTION DEVICE AND SYSTEM

RELATED APPLICATIONS

This application is a national stage application of PCT application PCT/AU2007/001381 filed Sep. 19, 2007, which claims the benefit of U.S. Provisional Application No. 60/846,572 filed Sep. 22, 2006 the disclosures of which are hereby incorporated by reference in their entirety.

BACKGROUND OF THE INVENTION

Conventional vehicle seatbelts typically take either of two main forms. The simplest is a lap belt that is secured on either side of the passenger's waist and extends across the waist in use. The most common is a lap-sash belt that similarly has a lower waist section extending across the waist of the passenger as well as an upper torso section extending diagonally across the torso from one side of the waist to the opposite shoulder of the passenger.

In the event of a vehicle accident, the waist section of both the above seatbelt types typically applies a large force across the lower abdomen of a passenger. This can cause serious abdominal injury to the passenger and is particularly dangerous for pregnant women.

SUMMARY OF THE INVENTION

The present invention relates to a seatbelt retention device, a vehicle seat assembly incorporating a seatbelt retention device and a vehicle seat and seatbelt system. It is the object of the present invention to substantially overcome or at least ameliorate one or more of the disadvantages of the prior art, or to provide a useful alternative.

In one embodiment, the present invention provides a seatbelt retention device including: a cushion adapted to be located on the upper seat surface of a vehicle seat; a base embedded in the cushion, the base being in the form of a rigid plate; and a seatbelt catch adapted to retain the waist section of a seatbelt, said catch comprising a rigid hook and being mounted on the base and projecting through a recessed are of the cushion; wherein the seatbelt retention device is adapted to receive a passenger on the base in use, such that the catch is accessible between the legs of the passenger.

In one embodiment, the seatbelt retention device is configured to locate the waist section of the seatbelt extending across and engaging an upper femoral portion of each leg of the passenger adjacent the hips of the passenger.

In one embodiment, said base comprises two opposing side regions extending laterally from a central region on which the catch is mounted, the seatbelt retention device being adapted to receive the passenger with each the side region of the base located directly below a respective leg of the passenger and the central region located below and between the legs of the passenger.

In one embodiment, the catch and the base are each formed from high tensile steel. The catch and the base are typically integrally formed. In one embodiment, the present invention provides a vehicle seat and seatbelt system including: a vehicle seat having an upper seat surface for seating a passenger; the seatbelt retention device defined above, the cushion being located on the upper seat surface; and a seatbelt associated with the vehicle seat, the seatbelt having a waist section adapted to extend across the waist of a passenger received on the cushion and the base in use, the seatbelt catch being adapted to retain the waist section of the seatbelt.

In one embodiment, the present invention provides a method of arranging a vehicle seatbelt over a passenger, the method comprising: locating the seatbelt retention device defined above on the upper surface of a vehicle seat, receiving the passenger on the cushion and the base such that the catch is accessible between the legs of the passenger; engaging a waist section of the seatbelt on the catch; and fastening the seatbelt. Typically, the seatbelt extends across and engages an upper femoral portion of each leg of the passenger.

In one embodiment, the present invention provides a vehicle seat assembly including: a vehicle seat having an upper seat surface for seating a passenger; a base embedded in the seat, the base being in the form of a rigid plate; a seatbelt catch comprising a rigid hook and being mounted on the base and projecting through the upper seat surface so as to be accessible, in use, between the legs of a passenger seated on the upper seat surface. Typically the catch is located so as to locate the waist section of the seatbelt, in use, extending across and engaging an upper femoral portion of each leg of the passenger adjacent the hips of the passenger.

In one embodiment, the base comprises two opposing side regions extending laterally from a central region on which the catch is mounted, the seatbelt assembly being adapted to receive the passenger with each said side region of the base located directly below a respective leg of the passenger and the central region located below and between the legs of the passenger. Preferably, the catch is formed from high tensile steel. The catch and the base are typically integrally formed.

In one embodiment, the seat is a child booster seat. In an alternative embodiment, the seat is a fixed regular vehicle seat permanently secured to a vehicle.

In one embodiment, the present invention provides a vehicle seat and seatbelt system including: the vehicle seat assembly defined above; and a seatbelt associated with the vehicle seat, the seatbelt having a waist section able to extend across the waist of a passenger seated on the upper seat surface in use, the catch being adapted to retain the waist section of the seatbelt.

In one embodiment, the present invention provides a method of arranging a vehicle seatbelt over a passenger, the method including: seating the passenger on upper seat surface of the seat of the vehicle seat assembly defined above, such that the catch is accessible between the legs of the passenger; engaging a waist section of the seatbelt on the catch; and fastening the seatbelt. Typically, the seatbelt extends across and engages an upper femoral portion of each leg of the passenger. In one embodiment, the catch is retractable and the method further comprises the step of deploying the catch before engaging the waist section of the seatbelt on the catch.

In one embodiment, the present invention provides a seatbelt retention device including: a base adapted to be located on the upper seat surface of a vehicle seat, the base being in the form of a rigid plate and including two opposing side regions extending laterally from a central region; and a seatbelt catch adapted to retain the waist section of a seatbelt, the catch including a rigid hook and being mounted on the central region and; wherein the seatbelt retention device is adapted to receive a passenger on the base in use with each said side region of the base located directly below a respective leg of the passenger and the central region located below and between the legs of the passenger such that the catch is accessible between the legs of the passenger. Typically, the seatbelt retention device is configured to locate the waist section of the seatbelt extending across and engaging an upper formal portion of each leg of the passenger adjacent the hips of the passenger. Preferably, the catch and the base are each formed from high tensile steel. The catch and the base are typically integrally formed.

In one embodiment, the present invention provides a vehicle seat and seatbelt system including: a vehicle seat having an upper seat surface for seating a passenger; the seatbelt retention device defined above located on the upper seat surface; and a seatbelt associated with the vehicle seat, the seatbelt having a waist section adapted to extend across the waist of a passenger seated on the base in use, the seatbelt catch being adapted to retain the waist section of the seatbelt.

In one embodiment, the present invention provides a method of arranging a vehicle seatbelt over a passenger, the method including: locating the seatbelt retention device defined above on the upper surface of a vehicle seat; receiving the passenger on the seatbelt retention device such that the catch is accessible between the legs of the passenger; engaging a waist section of the seatbelt on the catch; and fastening the seatbelt.

The above summary of the invention is not intended to describe each illustrated embodiment or every implementation of the present invention. The figures and the detailed description that follow more particularly exemplify these embodiments.

BRIEF DESCRIPTION OF THE DRAWINGS

Embodiments of the invention will now be described, by way of example only, with reference to the accompanying drawings wherein.

Figure 1:
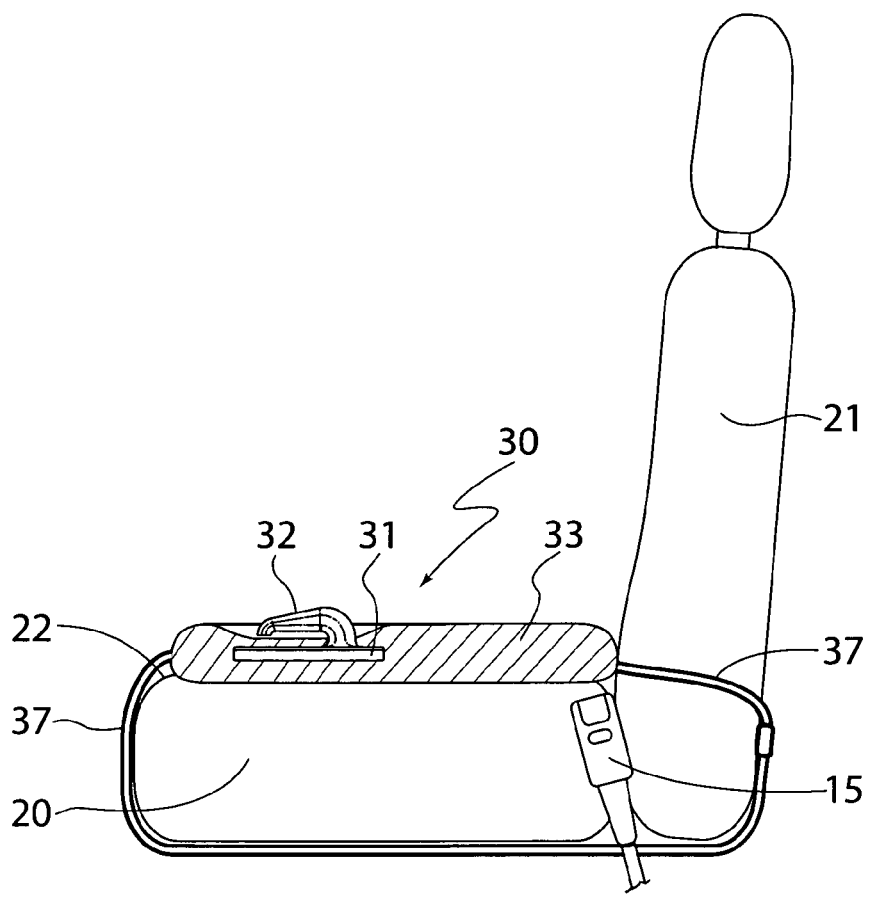
FIG. 1 is a side elevation, partially cross-sectioned view of a vehicle seat and seatbelt system.
Figure 2:
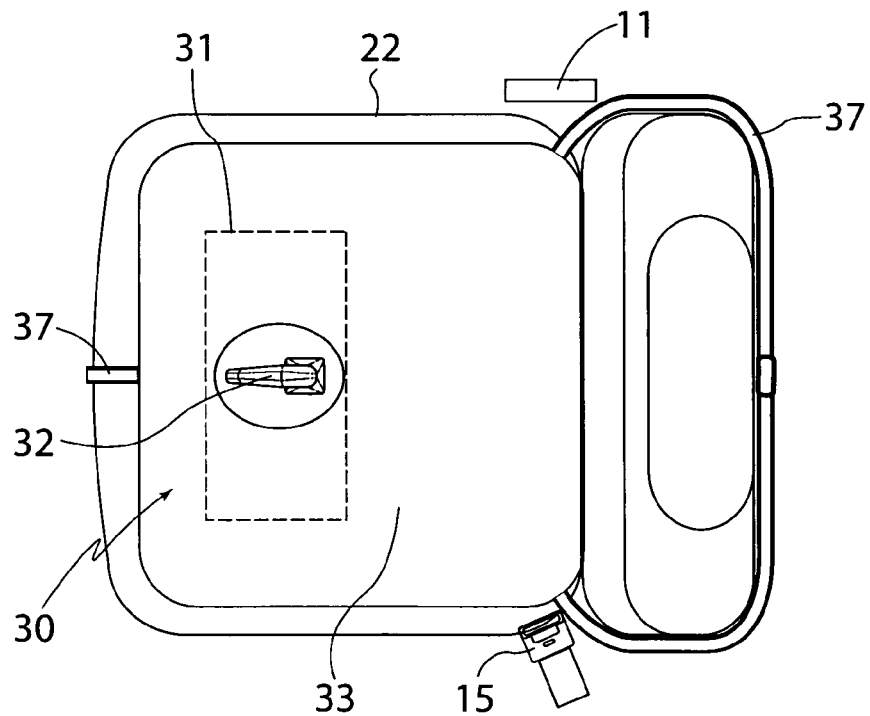
FIG. 2 is a plan view of the system of FIG. 1.
Figure 3:
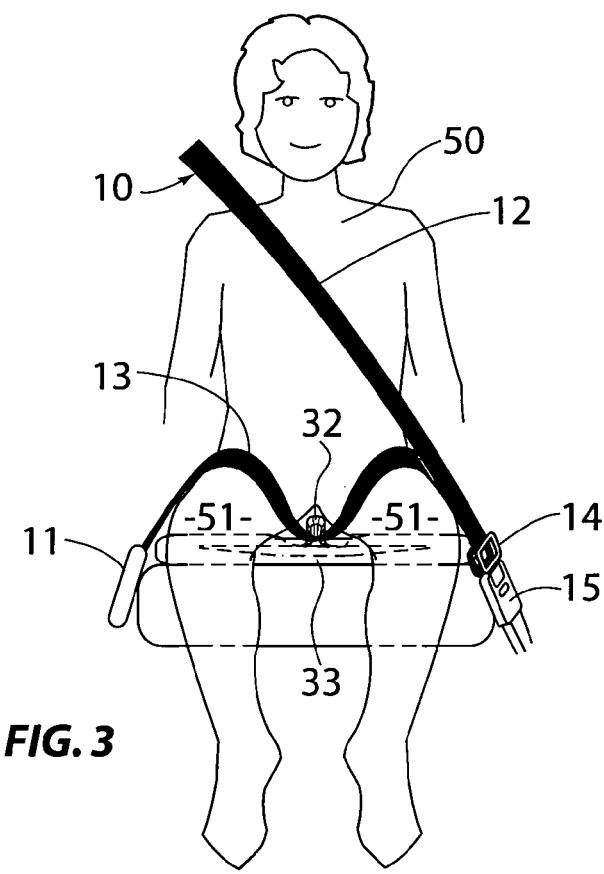
FIG. 3 is a front elevation view of the system of FIG. 1 in use.
Figure 4:
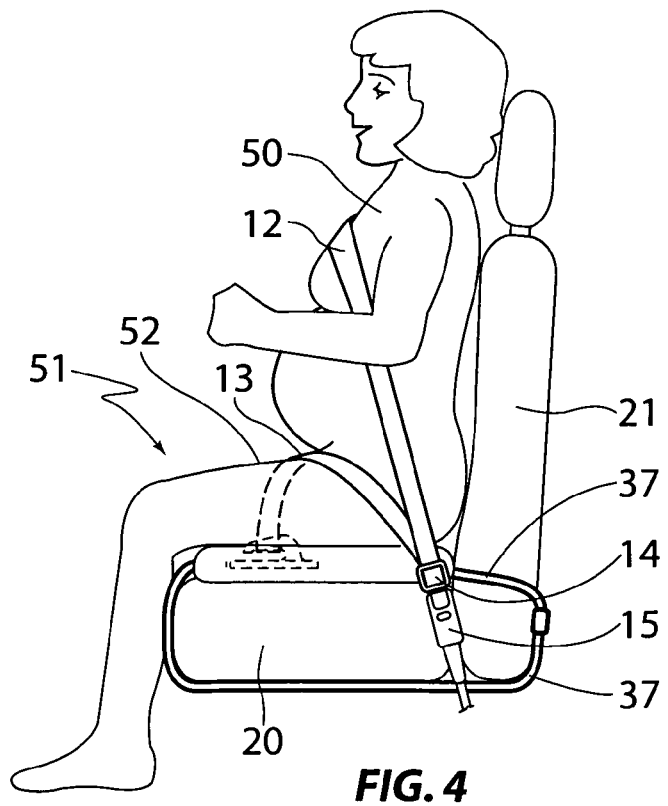
FIG. 4 is a side elevation view of the system of FIG. 1 in use.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention as defined by the appended claims.

DETAILED DESCRIPTION OF THE INVENTION

Referring to FIGS. 1 to 4 of the accompanying drawings, a vehicle seat and system includes a seatbelt 10, a conventional vehicle seat 20, and a seatbelt retention device 30. The vehicle seat 20 depicted is a standard motor vehicle seat, having a backrest 21 mounted at the rear of the seat 20. The seatbelt 10 is a standard lap-sash vehicle seatbelt that has a lower end thereof fixed to an anchor 11 adjacent the seat 20. The opposing end of the seatbelt 10 is mounted on the B pillar of the vehicle, using a retraction mechanism in the usual manner. The seatbelt 10 is divided between an upper torso section 12 and a lower waist section 13 by a seatbelt tongue 14 that is slidingly received on the seatbelt 10 and which engages a seatbelt buckle 15 mounted on the opposing side of the vehicle seat 20.

Figure 5:
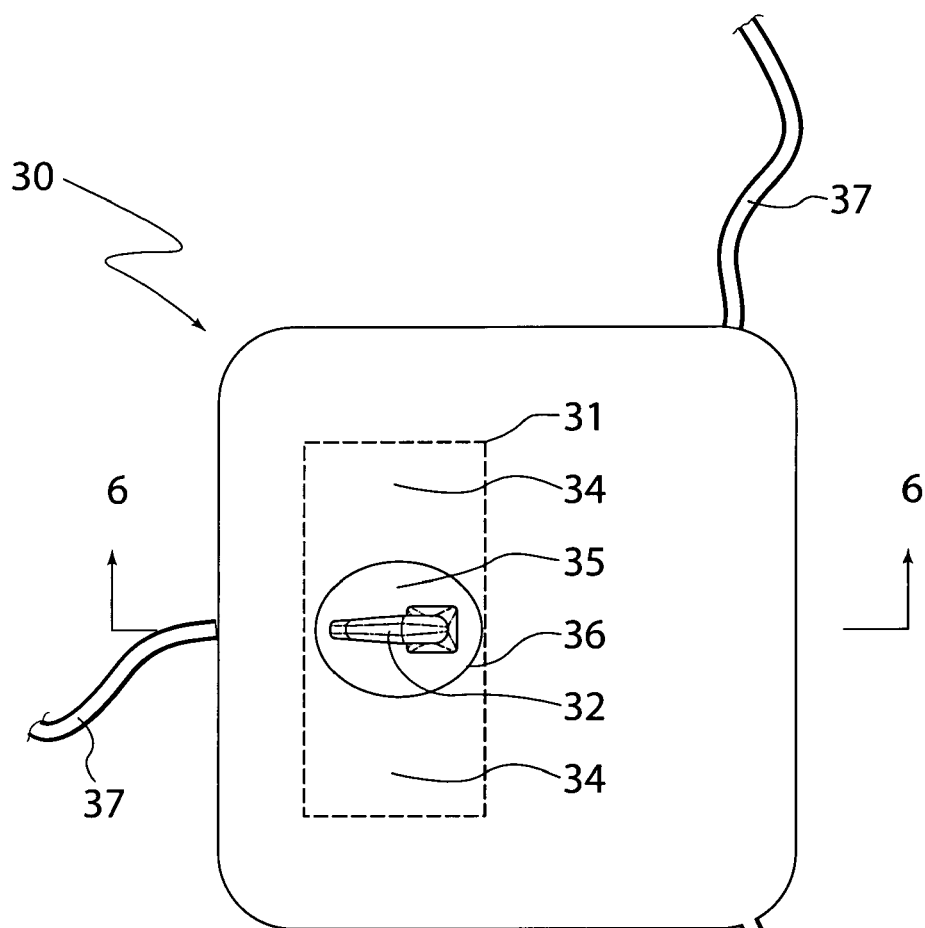
FIG. 5 is a plan view of the seatbelt retention device of the system of FIG. 1.
Figure 6:
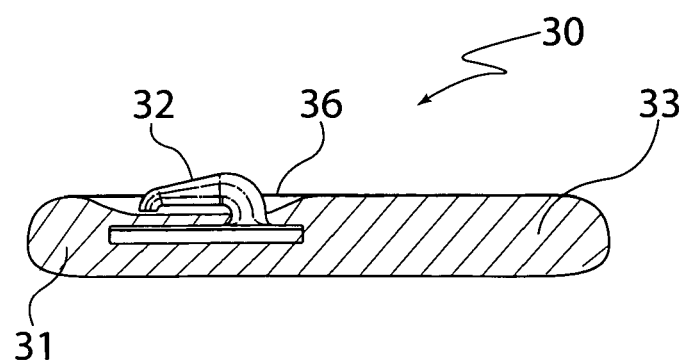
FIG. 6 is a cross-sectional view of the seatbelt retention device of FIG. 5 taken through section 6-6.
Figure 7:
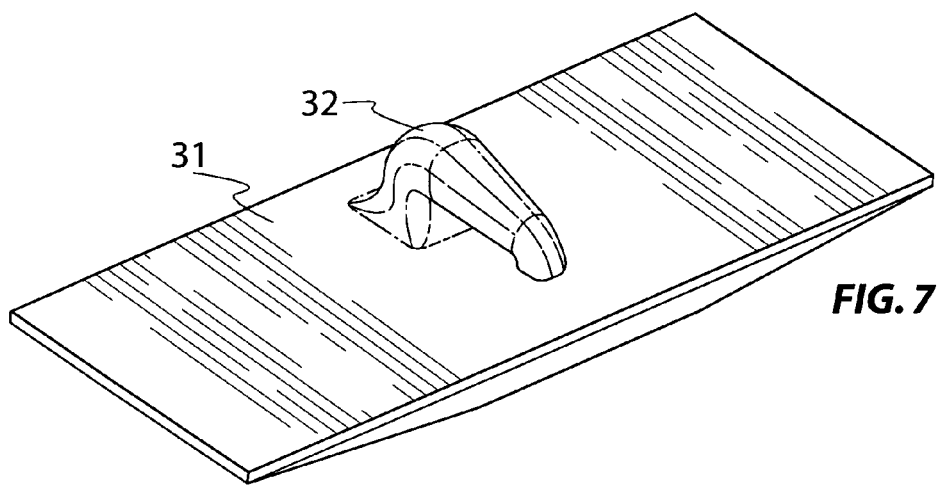
FIG. 7 is a perspective view of the base and catch of the seatbelt retention device of FIG. 5.
Figure 8:
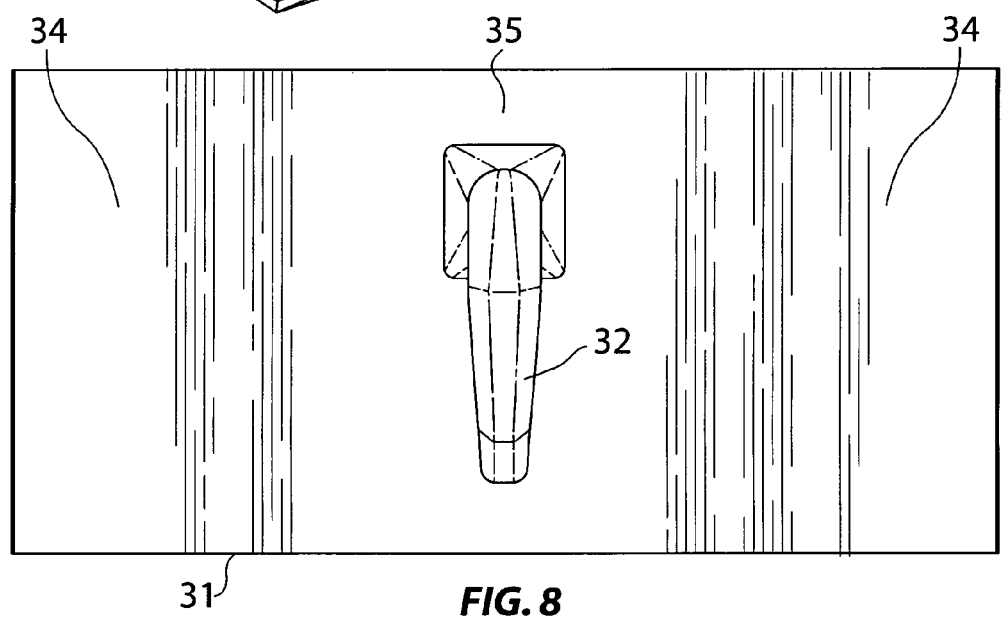
FIG. 8 is a plan view of the catch and base of FIG. 7.
Figure 9:
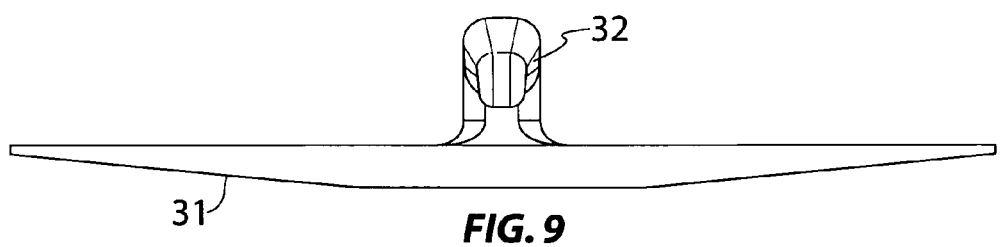
FIG. 9 is a front elevation view of the catch and base of FIG. 7.
Figure 10:
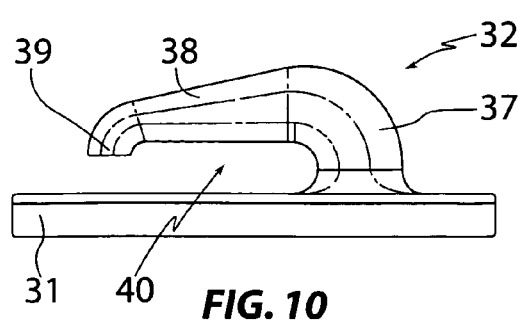
FIG. 10 is a side elevation view of the catch and base of FIG. 7.

The seatbelt retention device 30, depicted in greater detail in FIGS. 5 and 6, is a removeable unit adapted to be mounted on the upper seat surface 22 of the vehicle seat 20. The seatbelt retention device 30 comprises a base 31 and a seatbelt catch 32 mounted on the base 31. The seatbelt retention device 30 depicted further comprises a cushion 33 that substantially covers the upper surface of the seat 20. The base 31 is embedded within the cushion 33. The base 31 is here in the form of a plate and comprises two opposing side regions 34 and a central region 35 on which the catch 32, here in the form of a hook, is mounted. The seatbelt retention device 30 is adapted to receive a passenger 50 seated on the cushion 33 and base 31 such that the catch 32 is accessible between the legs 51 of the passenger 50. Specifically, the upper femoral region 52 of each leg 51 is located on a respective side region 34 of the base 31, thereby firmly retaining the base 31 (and accordingly the catch 32) in place during use.

The catch 32 protrudes through the cushion 33 in a recessed area 36 of the cushion 33 such that the catch 31 only projects slightly above the upper surface of the cushion 33, in the example embodiment shown, about 10 mm.

To assist in maintaining the location of the seatbelt retention device 30 on the seat 20 as a passenger enters or alights the vehicle, a system of straps 37 may be secured to the cushion 33 to pass around the backrest 21 and underneath the seat 20, with the straps being mutually attached behind the backrest 21.

To fasten the seatbelt 10, the seatbelt 10 is passed across the passenger 50 and the waist section of the seatbelt 10 is engaged on the catch 31. The waist section 13 of the seatbelt 10 is thus kept away from the abdomen of the passenger 50. Locating the catch 31 between the legs 51 of the passenger 50, projecting above the upper seat surface 22 of the seat 20, ensures the waist section 13 of the seatbelt extends across the upper femoral portion 52 of each leg 51 adjacent the hip rather than towards the knees of the passenger.

Further detail of the base 31 and catch 32 of the seatbelt retention device 30 is depicted in FIGS. 7 to 10. The catch 32 and base 31 are here integrally formed of high tensile steel. The catch 32 projects forward, and is formed of a vertically extending post 37 projecting from the upper surface of the base 31, a forwardly projecting arm 38 extending from the post 37, and a downwardly projecting lip 39 at the leading end of the arm 38. As can be seen, each of these elements of the catch 32 is rounded so as to minimize the possibility of catching the passenger's clothing on the catch 32 and preventing any possible damage to the passenger 50 himself/herself. The waist section 13 of the seatbelt 10 is retained by the catch 32 in the recess 40 defined between the lip 39 and post 37 of the catch 32 against the underside of the aim 38. Tension on the seatbelt 10 will retain the seatbelt within the recess 40, with the lip 39 inhibiting the seatbelt 10 from slipping off the end of the catch 32.

In the event of a vehicle collision, the restraining force applied to the passenger 50 by the waist section 13 of the seatbelt 10 will be applied across the legs 51 of the passenger 50, and particularly the upper femoral portion 52 of the legs 51 adjacent the hips, rather than across the lower abdomen. This reduces the likelihood of serious internal injury to the passenger 50. Further, if the passenger 50 is pregnant, this reduces the likelihood of serious injury to the fetus. Specifically, locating the waist section 13 of the seatbelt 10 across the upper femoral portion 52 of each leg 51 adjacent the hip will also greatly reduce the likelihood of injury to the legs as compared, for example, to positioning the waist section 13 close to the knees of the passenger, whereby forces applied to the lower portion of the passenger's femur might break the femur.

Figure 11:
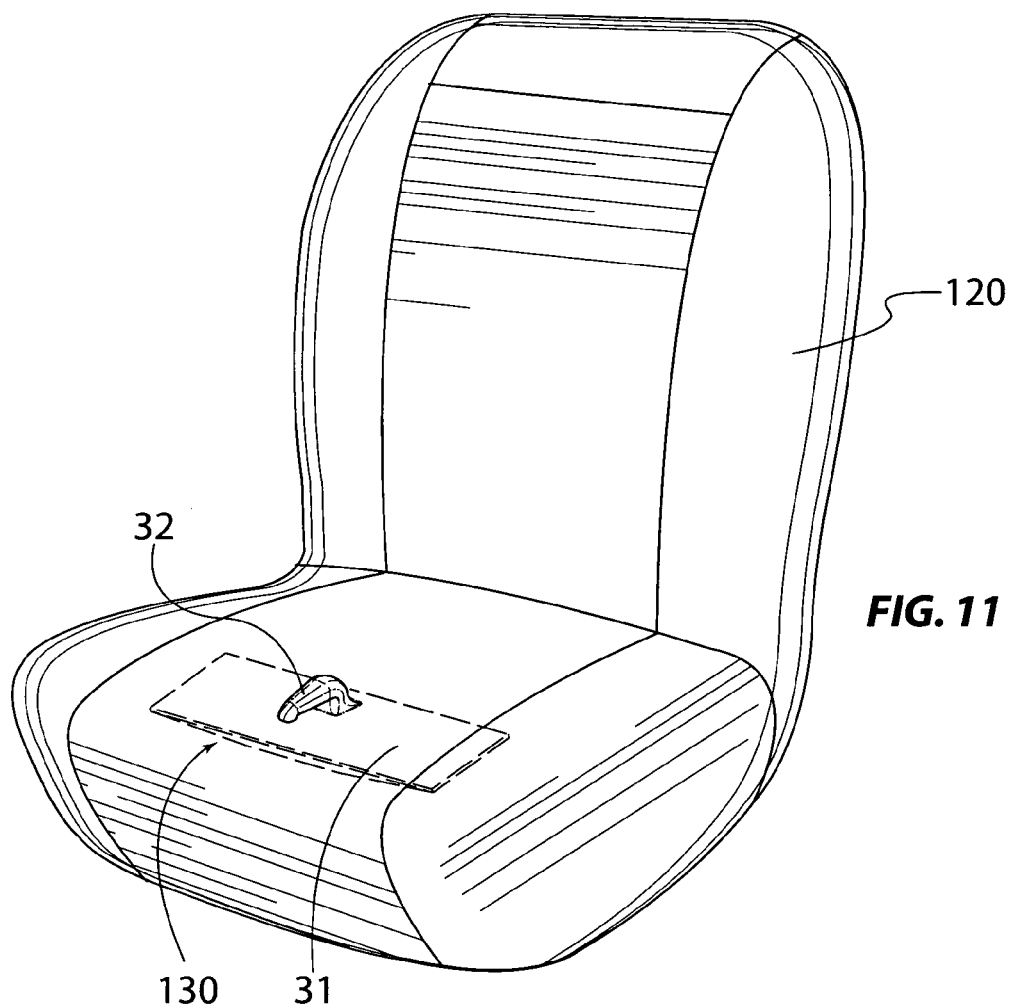
FIG. 11 is a perspective view a vehicle seat assembly comprising a child booster seat.

FIG. 11 depicts a vehicle seat assembly comprising a modified form of seatbelt retention device 130 mounted in a child/booster seat 120 (otherwise known simply as a child seat or booster seat) that is configured to be located on the upper seat surface of a standard vehicle seat to restrain a child. The base 31 of the seatbelt retention device 130 is mounted within the cushioned seat base section 121 of the child seat 120 and the catch 32 projects above the upper seat surface 122 of the seat base section 121. The catch 32 can alternatively be mounted directly to the structure of the seat base section 121, rather than having a separate plate mounted within the seat base section 121.

Figure 12:
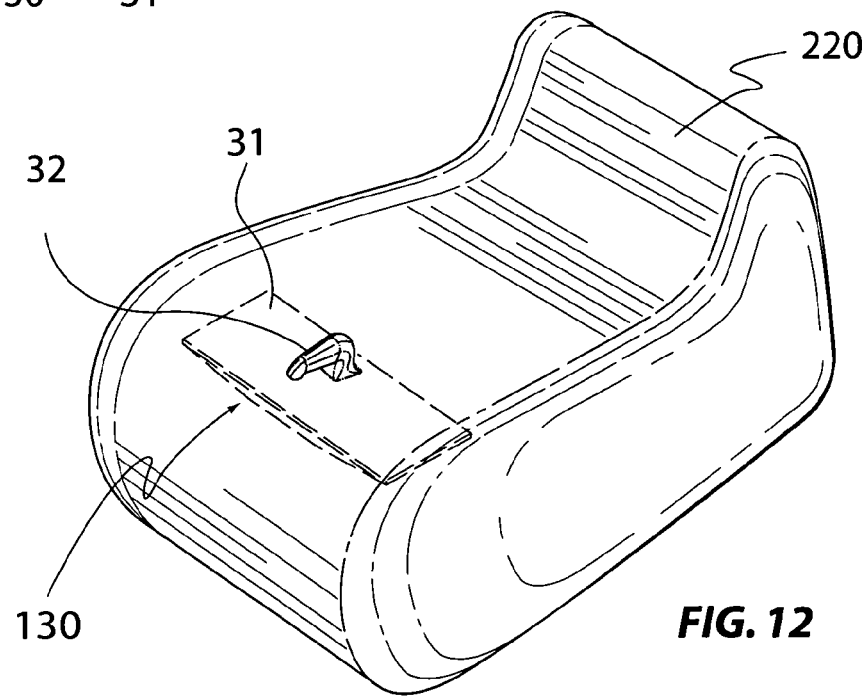
FIG. 12 is a perspective view of a vehicle seat assembly comprising a child booster seat base.

FIG. 12 depicts a similar arrangement with the seatbelt retention device 130 mounted in a child booster seat base 220 in a similar manner as described above in relation to FIG. 11.

Figure 13:
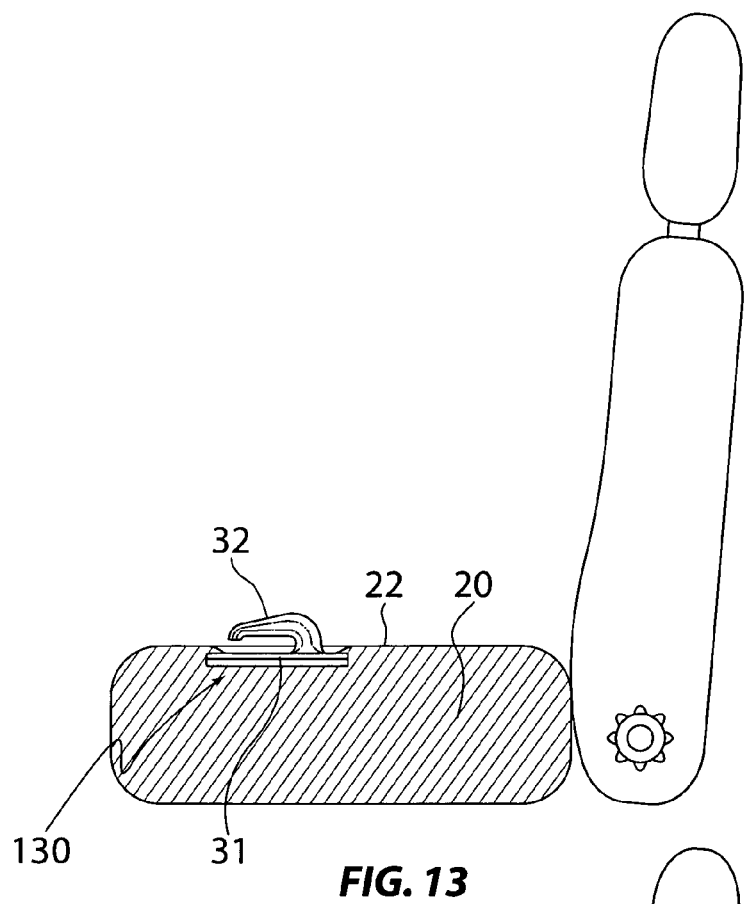
FIG. 13 is a partially cross-sectioned side elevation view of a vehicle seat assembly comprising a regular vehicle seat.

Similarly, as depicted in FIG. 13, the seatbelt retention device 130 may be integrally formed within a fixed regular vehicle seat 20 that is permanently secured to a vehicle, again with the base 31 mounted within the seat 20 and the catch 32 projecting through the upper seat surface 22 of the seat 20. Again, rather than mounting the catch 32 on a plate located within the seat 20, the catch can be mounted to the structural frame of the seat 20.

Figure 14:
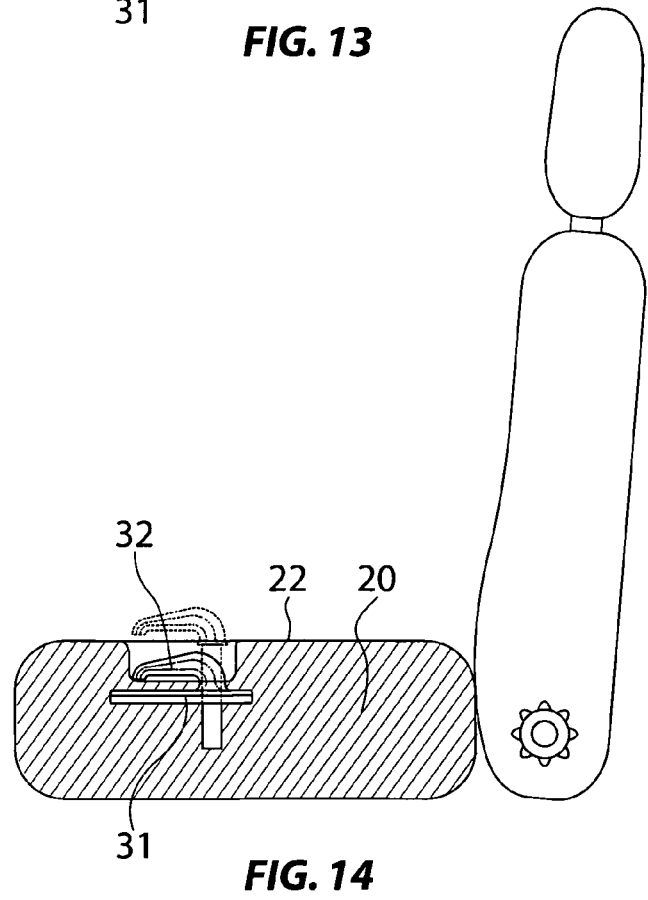
FIG. 14 is a partially cross-sectioned side elevation view of a vehicle seat assembly incorporating a retractable catch.

Referring to FIG. 14, the catch 32 can be retractable, such that it may be deployed when required and retracted when not in use.

The seatbelt retention device and seatbelt system may be utilized with seats for any form of vehicle, including motor vehicles, maritime vehicles (such as boats) and airborne vehicle (such as aeroplanes and helicopters).

Though the present invention can be described with reference to specific embodiments, it would be appreciated by those skilled in the art the invention can be embodied in any of various forms.

For purposes of interpreting the claims for the present invention, it is expressly intended that the provisions of Section 112, sixth paragraph of 35 U.S.C. are not to be invoked with respect to a given claim unless the specific terms "means for" or "step for" are recited in that claim.

The invention claimed is:

1. A seatbelt retention device comprising:
a cushion adapted to be located on the upper seat surface of a vehicle seat;
a base embedded in said cushion, said base being in the form of a rigid plate and further comprising two opposing side regions extending laterally from a central region on which said catch is mounted; and
a seatbelt catch adapted to retain the waist section of a seatbelt, said catch comprising a rigid hook and being mounted on said base and projecting through a recessed area of said cushion,
wherein said seatbelt retention device is adapted to receive a passenger with each said side region of said base located directly below a respective leg of the passenger and said central region located below and between the legs of the passenger, such that said catch is accessible between the legs of the passenger.

2. The seatbelt retention device of claim 1, wherein said seatbelt retention device is configured to locate the waist section of the seatbelt extending across and engaging an upper femoral portion of each leg of the passenger adjacent the hips of the passenger.

3. The seatbelt retention device of claim 1, wherein said catch and said base are each formed from high tensile steel.

4. The seatbelt retention device of claim 3, wherein said catch and said base are integrally formed.

5. A vehicle seat and seatbelt system comprising:
a vehicle seat having an upper seat surface for seating a passenger;
a seatbelt retention device of claim 1, said cushion being located on said upper seat surface; and
a seatbelt associated with said vehicle seat, said seatbelt having a waist section adapted to extend across the waist of a passenger received on said cushion and said base in use, said seatbelt catch being adapted to retain said waist section of said seatbelt.

6. A method of arranging a vehicle seatbelt over a passenger, said method comprising:
locating the seatbelt retention device of claim 1 on the upper surface of a vehicle seat;
receiving the passenger on said cushion and said base such that said catch is accessible between the legs of the passenger;
engaging a waist section of the seatbelt on said catch; and
fastening the seatbelt.

7. The method of claim 6, wherein the seatbelt extends across and engages an upper femoral portion of each leg of the passenger.

8. A vehicle seat assembly comprising:
a vehicle seat having an upper seat surface for seating a passenger;
a base embedded in said seat, said base being in the form of a rigid plate and comprising two opposing side regions extending laterally from a central region on which said catch is mounted;
a seatbelt catch adapted to retain the waist section of a seatbelt, said catch being comprising a rigid hook and being mounted on said base and projecting through said upper seat surface so as to be accessible, in use, between the legs of a passenger seated on said upper seat surface;
wherein said seat is adapted to receive the passenger with each said side region of said base located directly below a respective leg of the passenger and said central region located below and between the legs of the passenger.

9. The seat assembly of claim 8, wherein said catch is located so as to locate the waist section of the seatbelt, in use, extending across and engaging an upper femoral portion of each leg of the passenger adjacent the hips of the passenger.

10. The seat assembly of claim 8, wherein said catch is formed from high tensile steel.

11. The seat assembly of claim 8, wherein said catch and base are integrally formed.

12. The seat assembly of claim 8, wherein said catch is retractable.

13. The seat assembly of claim 8, wherein said seat is a child booster seat.

14. The seat assembly of claim 8, wherein said seat is a fixed regular vehicle seat permanently secured to a vehicle.

15. A vehicle seat and seatbelt system comprising:
a vehicle seat assembly of claim 8; and
a seatbelt associated with said vehicle seat, said seatbelt having a waist section able to extend across the waist of a passenger seated on said upper seat surface in use, said catch being adapted to retain said waist section of said seatbelt.

16. A method of arranging a vehicle seatbelt over a passenger, said method comprising:
seating the passenger on said upper seat surface of said seat of said vehicle seat assembly of claim 8, such that said catch is accessible between the legs of the passenger; engaging a waist section of the seatbelt on said catch; and fastening the seatbelt.

17. The method of claim 16, wherein the seatbelt extends across and engages an upper femoral portion of each leg of the passenger.

18. The method of claim 17, wherein said catch is retractable and said method further comprises the step of deploying said catch before engaging the waist section of the seatbelt on said catch.

\* \* \* \* \*